United States Patent
Park et al.

(10) Patent No.: US 9,117,110 B2
(45) Date of Patent: Aug. 25, 2015

(54) FACE DETECTION-PROCESSING CIRCUIT AND IMAGE PICKUP DEVICE INCLUDING THE SAME

(71) Applicant: Samsung Electronics Co., Ltd., Suwon-Si, Gyeonggi-Do (KR)

(72) Inventors: Jong-Seok Park, Suwon-si (KR); Eun-Sook Nam, Yongin-si (KR); Ho-June Leu, Suwon-si (KR); Jong-In Kim, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 247 days.

(21) Appl. No.: 13/768,032

(22) Filed: Feb. 15, 2013

(65) Prior Publication Data

US 2013/0223697 A1    Aug. 29, 2013

(30) Foreign Application Priority Data

Feb. 28, 2012  (KR) .................. 10-2012-0020387

(51) Int. Cl.
G06K 9/00 (2006.01)

(52) U.S. Cl.
CPC ........ G06K 9/00248 (2013.01); G06K 9/00228 (2013.01)

(58) Field of Classification Search
None
See application file for complete search history.

(56) References Cited

U.S. PATENT DOCUMENTS

| | | | | |
|---|---|---|---|---|
| 5,063,603 A * | 11/1991 | Burt | ............................. | 382/115 |
| 7,903,870 B1 * | 3/2011 | Budagavi | ..................... | 382/162 |
| 2002/0102024 A1 * | 8/2002 | Jones et al. | ................... | 382/225 |
| 2005/0280809 A1 * | 12/2005 | Hidai et al. | ............... | 356/237.3 |
| 2007/0019863 A1 | 1/2007 | Ito | | |
| 2008/0219558 A1 * | 9/2008 | Lu et al. | ........................ | 382/190 |
| 2008/0285849 A1 * | 11/2008 | Lu et al. | ........................ | 382/166 |
| 2009/0268080 A1 * | 10/2009 | Song et al. | .................... | 348/349 |
| 2010/0123802 A1 * | 5/2010 | Kim | ............. | 348/234 |
| 2010/0166261 A1 * | 7/2010 | Tsuji | ............................ | 382/103 |
| 2010/0173678 A1 * | 7/2010 | Kim et al. | ..................... | 455/566 |
| 2010/0303351 A1 * | 12/2010 | Umeda et al. | ................ | 382/167 |
| 2010/0329565 A1 * | 12/2010 | Kunieda | ....................... | 382/190 |
| 2011/0187882 A1 * | 8/2011 | Kim et al. | ................. | 348/222.1 |
| 2012/0076361 A1 * | 3/2012 | Fujiyoshi | ..................... | 382/103 |
| 2012/0081389 A1 * | 4/2012 | Dilts | ............................ | 345/619 |

(Continued)

FOREIGN PATENT DOCUMENTS

JP    2006-301847 A    11/2006
JP    2007-233517 A    9/2007

(Continued)

*Primary Examiner* — Chan Park
*Assistant Examiner* — Iman K Kholdebarin
(74) *Attorney, Agent, or Firm* — Harness, Dickey & Pierce

(57) ABSTRACT

A face detection-processing circuit includes a down-scaler, a face detection unit, a control unit and a down-scaling ratio controller. The down-scaler is configured to scale down a resolution of an input image including at least one subject person according to a down-scaling ratio to provide a first image. The face detection unit is configured to detect a face of the least one subject person in the first image and generate coordinate information on a region of the detected face part (face region). The control unit is configured to calculate a face detection index indicating a ratio of the face region to the first image based on the coordinate information to provide control signals based on the face detection index and a face detection signal indicating whether a face is detected. The down-scaling ratio controller is configured to adjust the down-scaling ratio in response to the control signal.

16 Claims, 10 Drawing Sheets

(56) References Cited

U.S. PATENT DOCUMENTS

| | | | |
|---|---|---|---|
| 2012/0099762 A1* | 4/2012 | Kunieda | 382/103 |
| 2013/0120617 A1* | 5/2013 | Kim | 348/240.2 |
| 2013/0120635 A1* | 5/2013 | Kim et al. | 348/333.06 |
| 2013/0162876 A1* | 6/2013 | Song et al. | 348/333.01 |

FOREIGN PATENT DOCUMENTS

| | | | |
|---|---|---|---|
| JP | 2008-191760 A | | 8/2008 |
| JP | 2011-008704 A | | 1/2011 |
| JP | 2011008704 A | * | 1/2011 |
| JP | 2011-078143 A | | 4/2011 |

* cited by examiner

FACE DETECTION-PROCESSING CIRCUIT AND IMAGE PICKUP DEVICE INCLUDING THE SAME

CROSS-REFERENCE TO RELATED APPLICATION(S)

This application claims priority under 35 USC §119 to Korean Patent Application No. 2012-0020387, filed on Feb. 28, 2012, in the Korean Intellectual Property Office (KIPO), the contents of which are incorporated herein in its entirety by reference.

BACKGROUND

1. Technical Field

Example embodiments relate to image processing fields, and more particularly to a face detection processing circuit and an image pick-up device including the same.

2. Discussion of the Related Art

Recently, digital cameras or digital video cameras, which pick up an image of an object using CCD or a MOS type solid-state image sensor, have a face detection function of automatically detecting the face of a subject person when picking up a still image or a dynamic image. In general, such digital cameras or the like having a face detection function perform focus control and exposure control based on image information on a region of a detected face part (face region).

SUMMARY

Some example embodiments provide a face detection-processing circuit configured to perform face detection rapidly.

Some example embodiments provide an image pickup device including the face detection-processing circuit.

In some example embodiments, a face detection-processing circuit (FDPC) includes a down-scaler, a face detection unit, a control unit and a down-scaling ratio controller. The down-scaler is configured to scale down a resolution of an input image including at least one subject person according to a down-scaling ratio to provide a first image. The face detection unit is configured to detect a face of the at least one subject person in the first image and generate a coordinate information on a region of the detected face part (face region). The control unit is configured to calculate a face detection index indicating a ratio of the face region to the first image based on the coordinate information of the face region to provide control signals based on the face detection index and a face detection signal indicating whether a face is detected in the first image. The down-scaling ratio controller is configured to adjust the down-scaling ratio in response to the control signal.

In some embodiments, the control unit may calculate the face detection index based on a sum of the face region, a peak area of the face region and a number of the detected face.

The face detection index may be proportional to a first ratio of the sum of the face region to the first image, a second ratio of the peak area of the face region to the first image and a third ratio of the number of the detected faces to the first image. The peak area may correspond to a face area in the face region.

The face detection index may have a value that is smaller than one and equal to or greater than zero.

In some example embodiments, the control unit may include a calculation unit configured to calculate the face detection index based on the coordinate information of the face region; a comparison unit configured to output first and second comparison signals based on the face detection index and first and second reference values; and a signal generator configured to generate the control signal and the face detection signal based on the first and second comparison signals and the face detection index.

The comparison unit may include a first comparator configured to compare the face detection index and the first reference value to output the first comparison signal; and a second comparator configured to compare the face detection index and the second reference value to output the second comparison signal.

In some example embodiments, the control unit may be configured to control the down-scaling ratio controller such that the down-scaling ratio controller decreases the down-scaling ratio if the face detection index corresponds to zero.

In some example embodiments, the control unit may be configured to provide the face detection signal having a first logic level when the face detection index is equal to or greater than the first reference value.

In some example embodiments, the FDPC may further include a processing unit configured to process the input image to provide the processed image to the face detection unit according to control of the control unit if the face detection index has a value which is smaller than a first reference value and which is greater than zero.

The processing unit may include a buffer configured to store the input image; a pattern remover configured to remove the face region in the input image to provide a second image to the face detection unit if the face detection index has a value between a second reference value and the first reference value, the second reference value being smaller than the first reference value; and a cropper configured to crop the face region in the input image to provide a third image to the face detection unit when the face detection index has a value between zero and the second reference value.

The face detection unit may be configured to detect another face region and generate another coordinate information on another face region to be provided to the control unit if the face detection index has a value between the second reference value and the first reference value.

The face detection unit may update the coordinate information on the face region based on the second image and may provide the updated coordinate information to the control unit if the face detection index has a value between zero and the second reference value.

In some example embodiments, the FDPC may further include a register configured to store the first and second reference values to be provided to the control unit.

The register may further include parameters that are required for the face detection unit to detect the face of the least one subject person.

In some example embodiments, an image pickup device includes an image sensor, a face detection-processing circuit and a display. The image sensor is configured to pick up an object image including at least one subject person. The face detection-processing circuit is configured to detect a face of at least one subject person in the object image. The display is configured to display the object image with a region of the detected face part (face region). The face detection-processing circuit includes a down-scaler configured to scale down a resolution of the object image according to a down-scaling ratio to provide a first image; a face detection unit configured to generate a coordinate information on the face region; a control unit configured to calculate a face detection index indicating a ratio of the face region to the first image based on the coordinate information of the face region to provide control signals based on the face detection index and a face detection signal indicating whether a face is detected in the first image; and a down-scaling ratio controller configured to adjust the down-scaling ratio in response to the control signal.

Accordingly, the FDPC and the image pickup device including the FDPC, according to some example embodiments, are configured to detect a face in the first image IMG1 whose resolution is adaptively reduced not in the original image and thus may reduce face detection time. In addition, the FDPC and the image pickup device include the pattern remover and the cropper for compensating for decreased face detection rate. Therefore, the image pickup device may perform the face detection operation rapidly on the input image using limited resources of the CPU efficiently.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
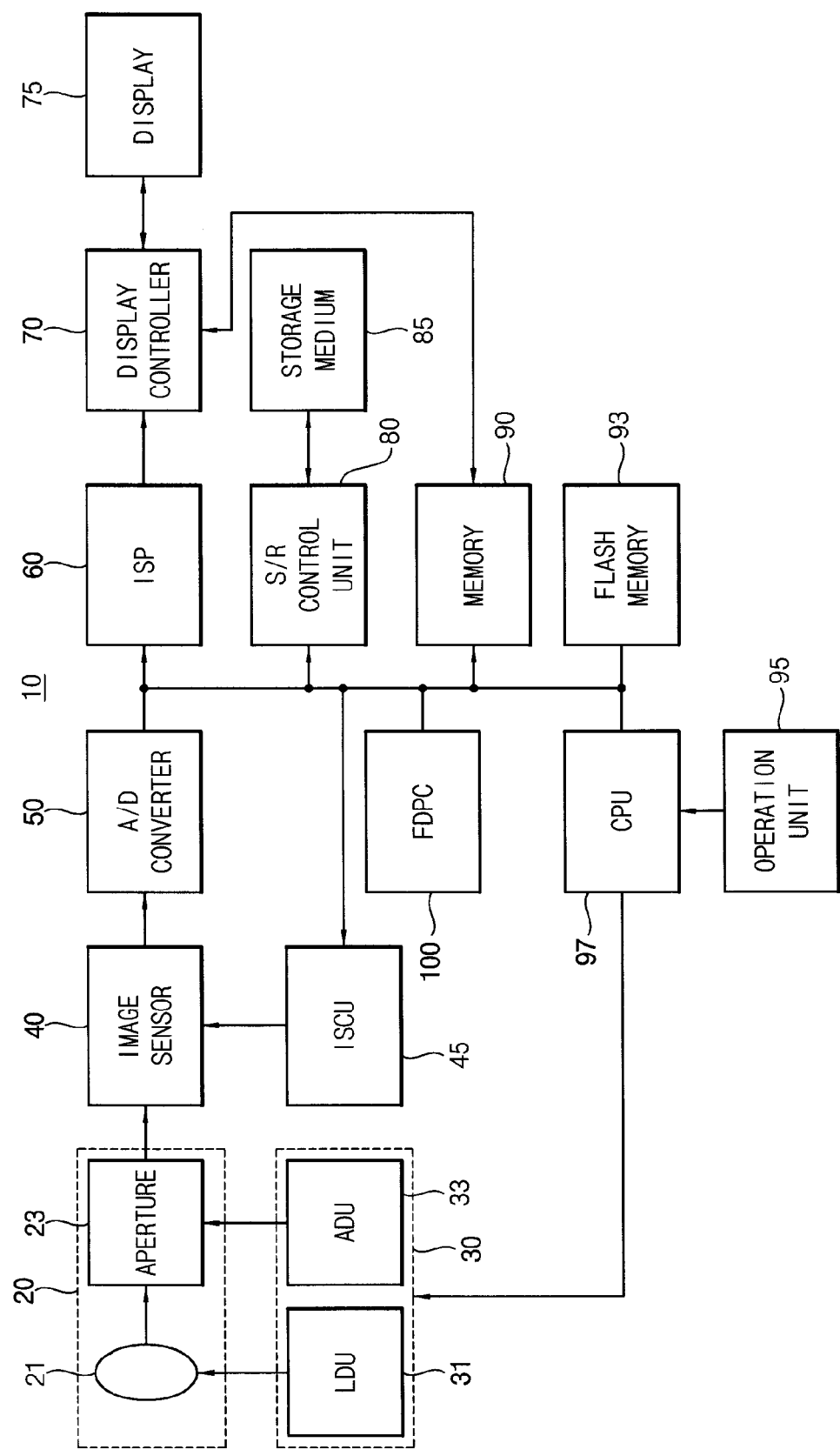
FIG. 1 is a block diagram illustrating an image pick-up device (digital camera) according to some example embodiments.

Various example embodiments will be described more fully hereinafter with reference to the accompanying drawings, in which some example embodiments are shown. The example embodiments may, however, be embodied in many different forms and should not be construed as limited to the example embodiments set forth herein. Rather, these example embodiments are provided so that this disclosure will be thorough and complete, and will fully convey the scope of the example embodiments of the inventive concepts to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "includes," "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an image pick-up device (digital camera) according to some example embodiments.

Referring to FIG. 1, an image pickup device 10 includes an optical unit 20, an optical driving unit 30, an image sensor 40, an image sensor control unit (ISCU) 45, an analog-to-digital (A/D) converter 50, an image signal processor (ISP) 60, a display controller 70, a display 75, a storing/reading control unit 80, a storage medium 85, a memory 90, a flash memory 93, an operation unit 95, a central processing unit (CPU) 97 and a face detection-processing circuit (FDPC) 100. The optical unit 20 may include a lens 21 and an aperture 23, and the optical driving unit 30 may include lens driving unit 31 and an aperture driving unit 33.

The lens driving unit 31 drives the lens 21 according to control of the CPU 97 and the aperture driving unit 33 drives the aperture 23 according to control of the CPU 97. The image sensor 40 performs photoelectric conversion on an optical image of an object image by the optical unit 20 to output an imaging signal. The ISCU 45 controls the image sensor 40 according to control of the CPU 97. The image senor 40 provides the imaging signal to the A/D converter 50. The A/D converter 50 converts the imaging signal to a digital signal to provide the digital signal to the ISP 60. The ISP 60 performs a RGB interpolation process of generating color component data (RGB data) on R, G, B for each pixel on an imaging signal undergone A/D conversion, a YUV conversion process of generating YUV data having a brightness signal (Y) and a color-difference signal (U, V) from the RGB data for each pixel, and a digital signal processing for improving an image quality, such as auto white balancing or contour enhancing. The YUV data converted through ISP 60 is successively stored in the memory 90 which is an SDRAM. In a recording mode for image pickup, the YUV data stored in the memory 90 is converted into a video signal through the ISP 60 every time the memory 90 stores one frame of data pieces. Thereafter, the converted video signal is displayed as a through image or a live view image on the display 75. In picking up an image under the recording mode, the storing/reading control unit 80 compresses and decodes image data temporarily in the memory 90 in the JPEG format and the compressed and encoded image is recorded in a still image file in the storage medium 85 such as various memory cards.

The still image file recorded in the storage medium 85 is arbitrarily read out in according to a selection operation of a user in a reproducing mode. The read-out still image file is expanded by the storing/reading control unit 80 and is extracted as YUV data in the memory 90. Thereafter, the YUV data is displayed as a still image on the display 75 by the display controller 70.

The operation unit 95 may include a plurality of keys such as a power key, a mode changing key for changing over a basic operation mode between the recording mode and the reproducing mode, a MENU key and a shutter key. Each key has an operational status scanned by the CPU 97 as needed. Note that the shutter key has a so-called half shutter function of enabling user to operate the shutter key in two stages through a half-pressed position for a preliminary image pickup and a full-pressed position for instructing an actual image pickup operation.

The FDPC 100 detects a face part having a similar characteristic to model patterns relating to a face of a person, such as contour and color prepared (stored) beforehand, on image data of one frame (hereinafter frame image) generated by the ISP 60. Further, the FDPC 100 creates coordinate information on a region corresponding to a detected face part (hereinafter, face region), and transmits the coordinate information to the CPU 97.

The FDPC 100 investigates permanent characteristics of a face, for example, facial elements such as eyes, nose, mouth, texture and skin color in a characteristic based face detection method and calculates face characteristic coordinates. Of the various characteristics of a face, the skin color that is less sensitive to a change in movement, rotation and size of a face, is a most used method.

In a face template based detection method of the face detection method by the FDPC 100, several standard patterns are generated about a face and then the patterns are stored for face detection. The patterns are compared one by one to an image in a search window so that a face is detected. As a method for face detection, a face detection method based on a support vector machine (SVM) is widely used. According to SVM based method, other different areas are sub-sampled from an image and a face and non-face (a portion that is not a face) are studied through a study apparatus, and then a face is identified from an input image.

The CPU 97 controls the individual units of the image pickup device 10 and performs auto exposure (AE) control based on brightness information included in an imaging signal, an auto focus (AF) control through a contrast detection scheme and face detection control, and the like. Various kinds of programs for causing the CPU 97 to do such controls and various data necessary for controls are stored in the flash memory 93.

Figure 2:
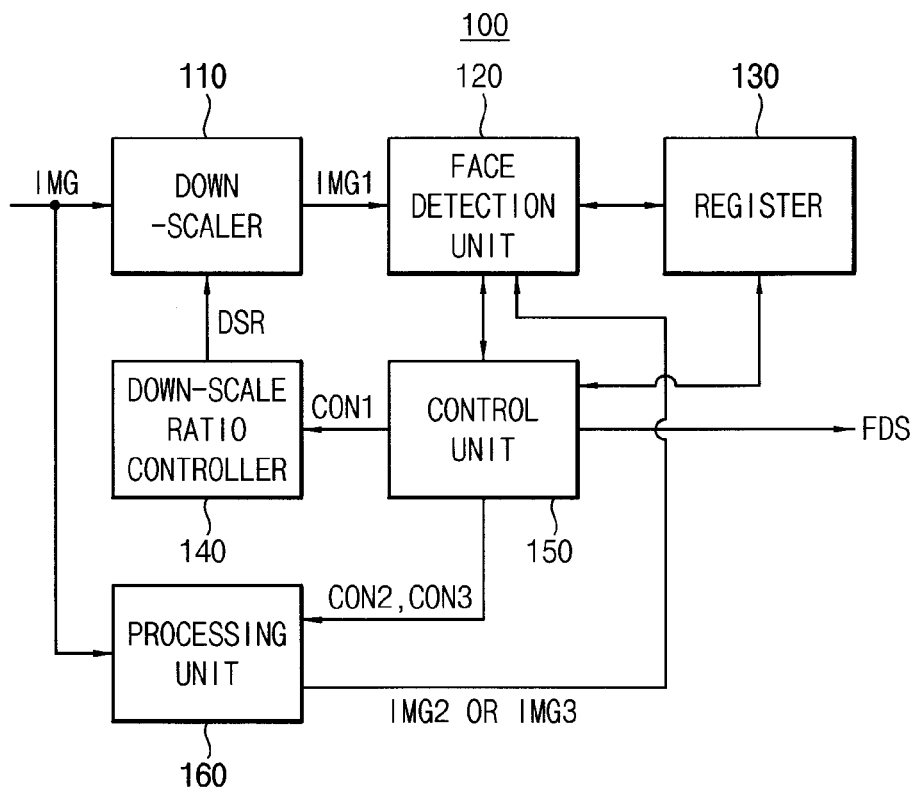
FIG. 2 is a block diagram illustrating an example of the FDPC in FIG. 1 according to some example embodiments.

FIG. 2 is a block diagram illustrating an example of the FDPC in FIG. 1 according to some example embodiments.

Referring to FIG. 2, the FDPC 100 may include a down-scaler 110, a face detection unit 120, a register 130, a down-scaling ratio controller 140, a control unit 150 and a processing unit 160.

The down-scaler 110 scales down a resolution of an input image IMG including at least one subject person according to a down-scaling ratio DRS to provide a first image IMG1. For example, when the input image IMG has a resolution corresponding to H*V (where, H denotes a number of pixels in a row direction in the input image IMG and V denotes a number of pixels in a column direction in the input image IMG, the first image IMG1 may have a resolution corresponding to (H/n)*(V/n) (n is a natural number greater than one).

The face detection unit 120 detects a face of the at least one subject person in the first image IMG1 and generates coordinate information on a region of the detected face part (hereinafter, a face region). For detecting the face of the at least one subject person in the first image IMG1, the face detection unit 120 may use one of the characteristic based face detection method, the face template based detection method and the SVM method.

The control unit 150 calculates a face detection index indicating a ratio of the face region to the first image IMG1 based on the coordinate information of the face region to provide control signals CON1, CON2 and CON3 based on the face detection index and a face detection signal FDS indicating whether a face is detected in the first image IMG1. The control unit 150 generates the face detection index indicating the ratio of the face region to the first image IMG according to following equation 1.

$$P(\text{face detection index})=K(a*P\text{Area}+b*S\text{Area}+c*\text{FaceNum}),$$ [Equation 1]

where K denotes a reciprocal of area of the first image IMG1, PArea denotes a sum of face area in the face region (or peak area of the face region), SArea denotes a sum of area of the face region, FaceNum denotes a number of detected faces and a, b and c respectively denotes constants between zero and one.

Therefore, the control unit 150 may calculate the face detection index (P) based on the sum of the area of the face region, the sum of face area of the face region and the number of detected faces. Accordingly, the face detection index (P) may be proportional to a first ratio of the sum of the face region to the first image IMG1, a second ratio of the peak area of the face region to the first image IMG1 and a third ratio of the number of the detected face to the first image IMG. As a result, the face detection index (P) has a value which is smaller than one and which is equal to or greater than zero.

The control unit 150 may provide a first control signal CON1 to the down scaling ratio controller 140 or provide second and third control signals CON2 and CON3 to the processing unit 160 according to the face detection index (P). For example, when the face detection index (P) corresponds to zero, which indicates that no face is detected in the first image IMG1, the control unit 150 provides the first control signal CON1 to the down-scaling ratio controller 140 and the down-scaling ratio controller 140 decreases the down-scaling ratio DSR in response to the first control signal CON1. For example, when the face detection index (P) has a value which is not zero, the control unit 150 provides the face detection signal FDS having a first logic level or enables the second control signal CON2 or the third control signal CON3 according to the face detection index (P). When the second control signal CON2 or the third control signal CON3 is enabled, the processing unit 160 may process the input image IMG to provide a second image IMG2 or a third image IMG3 to the face detection unit 120.

The register 130 may store data which the face detection unit 120 requires for detecting face and data which the control unit 150 requires for calculating the face detection index (P).

Figure 3:
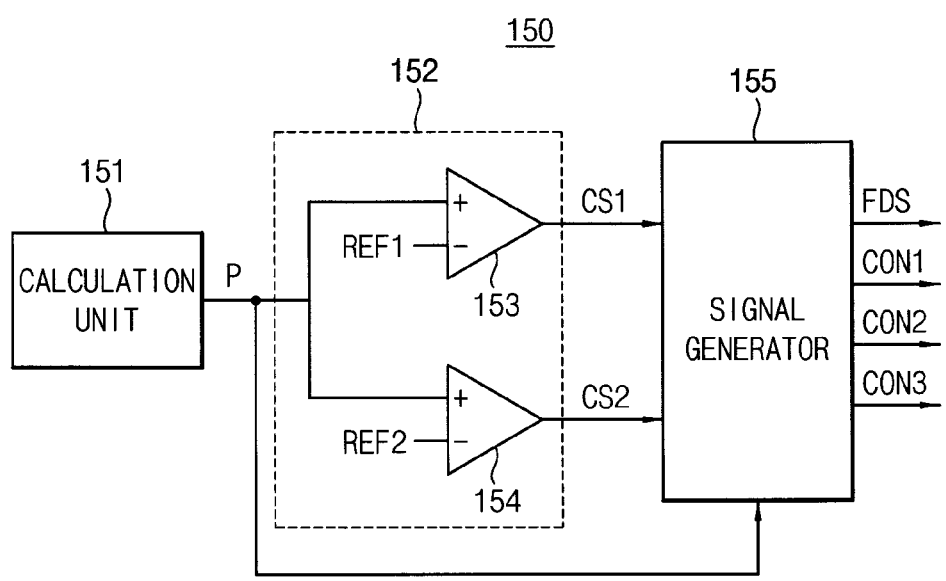
FIG. 3 is a block diagram illustrating an example of the control unit according to some example embodiments.

FIG. 3 is a block diagram illustrating an example of the control unit according to some example embodiments.

Referring to FIG. 3, the control unit 150 may include a calculation unit 151, a comparison unit 152 and a signal generator 155.

The calculation unit 151 calculates the face detection index P based on the coordinate information of the face region provided from the face detection unit 120. The comparison unit 152 includes first and second comparators 153 and 154. The first comparator 153 compares the face detection index P with a first reference value REF1 to provide a first comparison signal CS1. The second comparator 154 compares the face detection index P with a second reference value REF2 to provide a second comparison signal CS2. The first reference value REF1 may be greater than the second reference value REF1, and the first and second reference values REF1 and REF2 may be provided from the register 130. In addition, the first and second reference values REF1 and REF2 may be changed by a user. The signal generator 155 generate the face detection signal FDS and the control signals CON1, CON2 and CON3 based on the face detection index P and the first and second reference values REF1 and REF2.

For example, when the face detection index P corresponds to zero, which indicates that no face is detected in the first image IMG1, the signal generator 155 provides the first control signal CON1 having a first logic level to the down-scaling ratio controller 140 without regard to the first and second comparison signals CS1 and CS2 and the down-scaling ratio controller 140 decreases the down-scaling ratio DSR in response to the first control signal CON1. The signal generator 155 provides the CPU 97 with the face detection signal FDS corresponding to '000'.

For example, when the face detection index P has a value equal to or greater than the first reference value REF1, which indicates that a face is detected in the first image IMG1, the first and second comparison signals CS1 and CS2 correspond to '11', the signal generator 155 provides the CPU 97 with the face detection signal FDS corresponding to '111' in response to the first and second comparison signals CS1 and CS2 and the CPU 97 controls the ISP 60 in response to the face detection signal FDS to perform the AF control and the AE control on the input image based on the detected face region.

For example, when the face detection index P has a value between the second reference value REF2 and the first reference value REF1, which indicates that a face is detected in the first image IMG1, the first and second comparison signals CS1 and CS2 correspond to '01'. The signal generator 155 provides the CPU 97 with the face detection signal FDS corresponding to '101' in response to the first and second comparison signals CS1 and CS2 with '01', and the signal generator 155 provides the processing unit 160 with the second control signal CON2 having a first logic level.

For example, when the face detection index P has a value between zero and the second reference value REF2, which indicates that a face is detected in the first image IMG1, the first and second comparison signals CS1 and CS2 correspond to '00'. The signal generator 155 provides the CPU 97 with the face detection signal FDS corresponding to '100' in response to the first and second comparison signals CS1 and CS2 with '00', and the signal generator 155 provides the processing unit 160 with the third control signal CON3 having a first logic level.

The CPU 97 controls the ISP 60 to perform the AF control and the AE control on the input image based on the detected face region only when the CPU 97 receives the face detection signal FDS with '111'.

Figure 4:
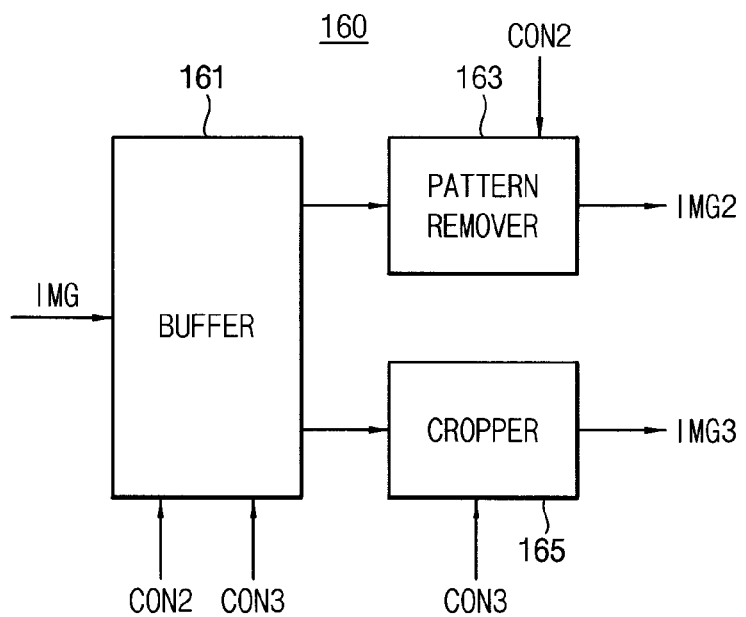
FIG. 4 is a block diagram illustrating an example of the processing unit in FIG. 3 according to some example embodiments.

FIG. 4 is a block diagram illustrating an example of the processing unit in FIG. 3 according to some example embodiments.

Referring to FIG. 4, the processing unit 160 may include a buffer 161, a pattern remover 163 and a cropper 165.

The buffer 161 stores the input image IMG. The buffer provides the input image IMG to the pattern remover 163 when the second control signal CON2 is enabled, and the buffer provides the input image IMG to the cropper 165 when the third control signal CON3 is enabled.

When the face detection index P has a value between the second reference value REF2 and the first reference value REF1, which indicates that a face is detected in the first image IMG1, the pattern remover 163 may remove a region corresponding to the face region in the first image IMG1 in the input image IMG to provide the second image IMG2 to the face detection unit 120, in response to the second control signal CON2 which is enabled. That is, the pattern remover 163 writes data '0' to the region corresponding to the face region in the first image IMG1 in the input image IMG. The face detection unit 120 receives the second image IMG2, performs face detection operation on the second image IMG2 and updates the coordinate information on the face region according to the performed face detection operation. The updated coordinate information on the face region is provided to the control unit 150. The control unit 150 updates the face detection index P according to the updated coordinate information on the face region.

When face detection index P has a value between zero and the second reference value REF2, which indicates that a face is detected in the first image IMG1, the cropper 165 may crop a region corresponding to the face region in the first image IMG1 in the input image IMG to provide the third image IMG3 to the face detection unit 120, in response to the third control signal CON3 which is enabled. The face detection unit 120 receives the third image IMG3, performs face detection operation on the third image IMG3 and updates the coordinate information on the face region according to the performed face detection operation. The updated coordinate information on the face region is provided to the control unit 150. The control unit 150 updates the face detection index P according to the updated coordinate information on the face region.

When the face detection index P has a value equal to or greater than the first reference value REF1 (for example, 0.15), the face region may be referred to as dominant in the input image IMG. Therefore, when the face detection index P has a value equal to or greater than the first reference value REF1, there is no need to detect another face in the input image IMG. When the face detection index P has a value equal to or greater than the first reference value REF1, the signal generator 155 provides the CPU 97 with the face detection signal FDS corresponding to '111' and the CPU 97 controls the ISP 60 in response to the face detection signal FDS to perform the AF control and the AE control. Therefore, the image pickup device 10 performs rapid face detection operation.

When the face detection index P has a value between the second reference value REF2 (for example, 0.05) and the first reference value REF1 (for example, 0.15), there is a possibility that the face detection unit 120 misses a face in the first image IMG1, because the resolution of the input image IMG is scaled-down by the down-scaler 110. Therefore, there is a need for detecting a face in the input image IMG having an original resolution. Since the face detection index P having a value between the second reference value REF2 and the first reference value REF1 indicates that a face is detected in the first image IMG1 having a down-scaled resolution, a face detection operation is performed on the input image except the region corresponding to the face region in the first image IMG1. The face detection operation may be rapidly performed because the input image IMG is already stored in the buffer 161.

When face detection index P has a value between zero and the second reference value REF2 (for example, 0.05), there is a possibility that the detected face has weak characteristics or the face region is wrongly detected. Therefore, there is a need for detecting a face in a cropped face region corresponding to the face region in the second image IMG2. The face detection operation may be rapidly performed because the face detection operation is performed in the cropped face region.

FIGS. 5A through 5E illustrates various images of the image pickup device of FIG. 1.

Figure 5A:
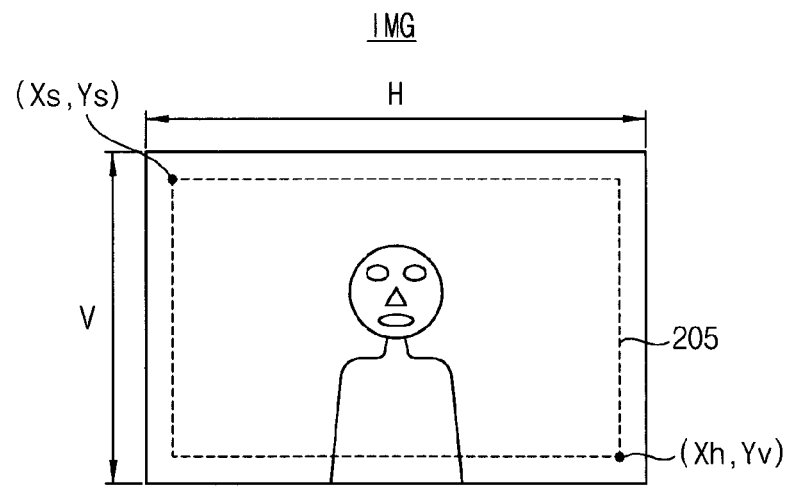
FIGS. 5A through 5E illustrates various images of the image pickup device of FIG. 1.
Figure 5B:
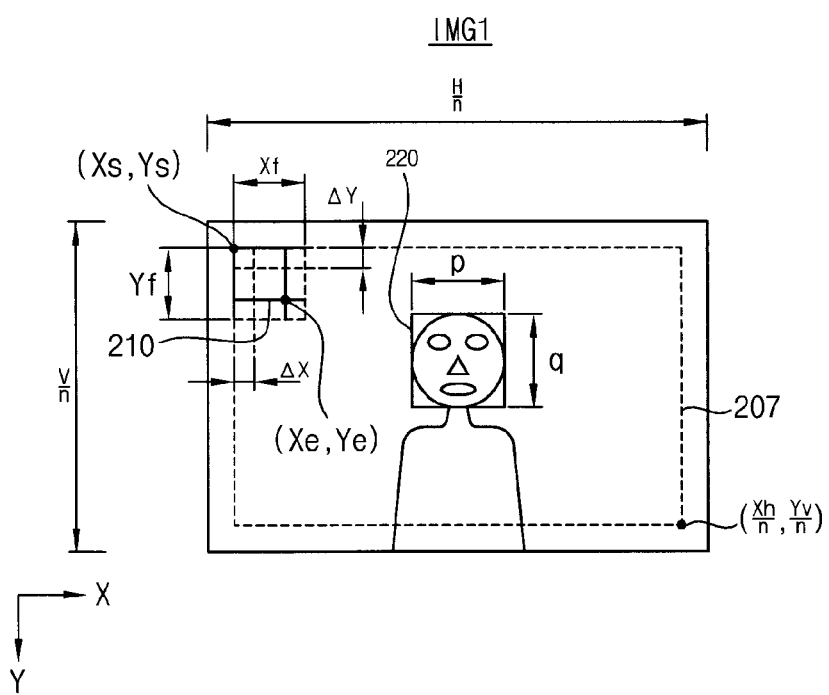
Figure 5C:
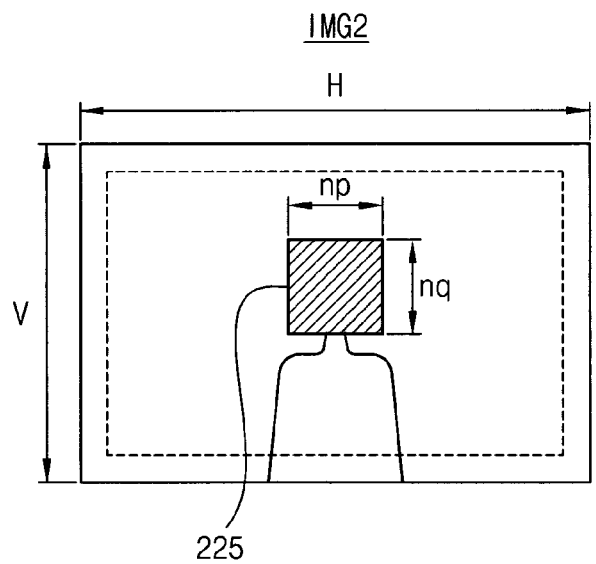
Figure 5D:
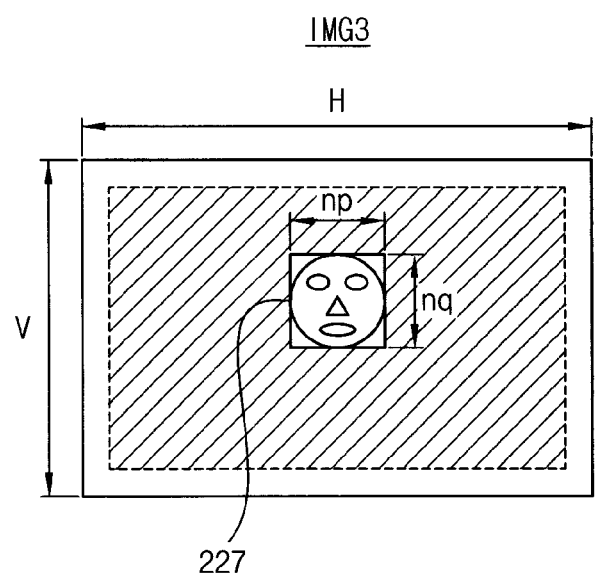
Figure 5E:
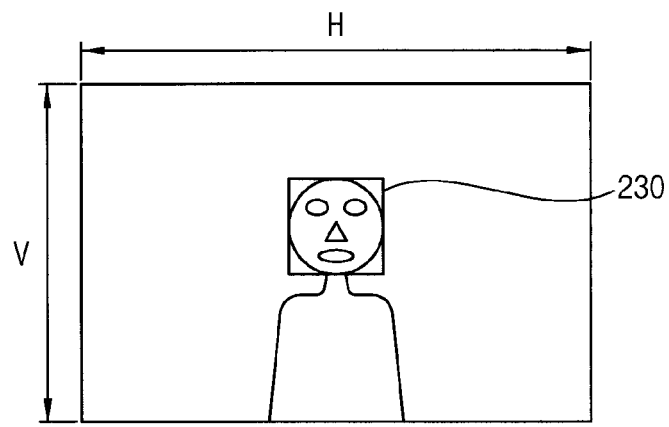

FIG. 5A illustrates the input image.
FIG. 5B illustrates the first image.
FIG. 5C illustrates the second image.
FIG. 5D illustrates the third image.
FIG. 5E illustrates a live-view image displayed in the display.

Referring to FIG. 5A and FIG. 5B, the down-scaler 110 scales down a resolution of the input image IMG having a resolution corresponding to H*V to provide the first image IMG1 having a resolution corresponding to (H/n)*(V/n). When the face detection operation is performed on the input image IMG, a face search 205 is determined by start points Xs and Ys and end points Xh and Yv of the input image IMG. However, when the face detection operation is performed on the first image IMG1, a face search region 207 is determined by start points Xs and Ys and end points Xh/n and Yv/n of the first image IMG1. The face search region 207 is reduced by 1/n2 to the face search region 205.

The face detection unit 120 sets sizes Xf, Yf of the face detection region 210 subjected to a pattern matching. In addition, the face detection unit 120 sets the value of the start points Xs, Ys of the face detection region 210 to '0' and sets the value of the end points Xe, Ye of the face detection region 210 to values corresponding to the start points Xs and Ys and the sizes Xf, Yf. The face detection unit 120 performs face detection operation through a pattern matching on the face detection region 120 having the sizes Xf, Yf. The face detection unit 120 repeats the same face detection operation by shifting the face detection region 210 by shift units ΔX and ΔY in the X direction and in the Y direction to update the start points Xs, Ys and the end points Xe, Ye of the face detection region 210. While the face detection unit 120 repeats the same face detection operation, the face detection unit 120 transmits the coordinate information (updates the start points Xs, Ys and the end points Xe, Ye) of the face detection region 210 to the control unit 150 every time a face is detected. The control unit 150 transmits the coordinate information to the CPU 97 while the control unit 150 calculates the face detection index P based on the coordinate information. The CPU overlaps a face detection frame indicating the face region on the live view image displayed in the display 75 based on the coordinate information. FIG. 5E illustrates the live-view image on which a face detection frame 230 is displayed when the face detection operation (that is, one cycle of face detection process) is completed on the input image IMG.

Referring to FIG. 5B again, the control unit 150 calculates the face detection index P based on the coordinate information of the face region 220 and generates the face detection signal FDS and the control signals CON1, CON2 and CON3 according to the calculated face detection index P. The face region 220 has an area corresponding to p*q (p and q are greater than zero).

When the face detection index P has a value equal to or greater than the first reference value REF1, the control unit 150 provides the CPU 97 with the face detection signal FDS corresponding to '111'.

When the face detection index P has a value between the second reference value REF2 and the first reference value REF1, the control unit enables the second control signal CON2. The pattern remover 163 may remove the region corresponding to the face region in the first image IMG1 in the input image IMG to provide the second image IMG2 to the face detection unit 120, in response to the second control signal CON2 which is enabled by writing data '0' to the region 225 corresponding to the face region in the first image IMG1 in the input image IMG as illustrated in FIG. 5C. The region 225 corresponding to the face region in the first image IMG1 in the input image IMG has an area corresponding to np*nq.

When face detection index P has a value between zero and the second reference value REF2, the cropper 165 crops a region 227 corresponding to the face region in the first image IMG1 in the input image IMG to provide the third image IMG3 to the face detection unit 120, in response to the third control signal CON3 which is enabled as illustrated in FIG. 5D. The cropped region 227 corresponding to the face region in the first image IMG1 has an area corresponding to np*nq.

Figure 6:
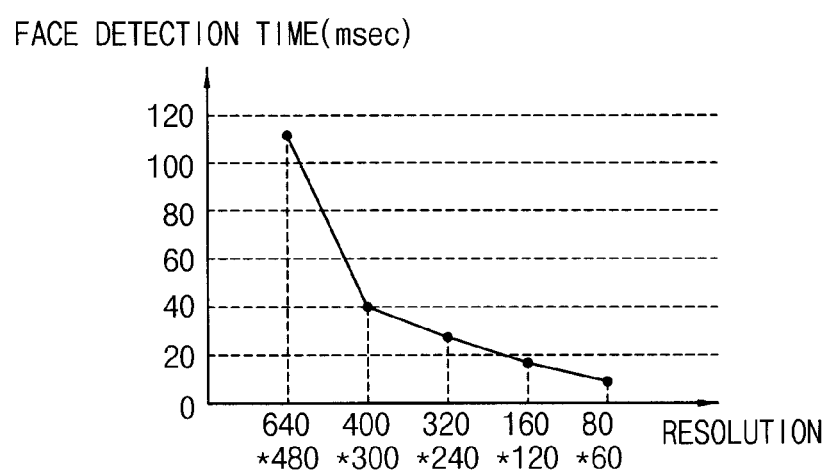
FIGS. 6 and 7 are graphs illustrating relationships between resolution of an image and face detection time.
Figure 7:
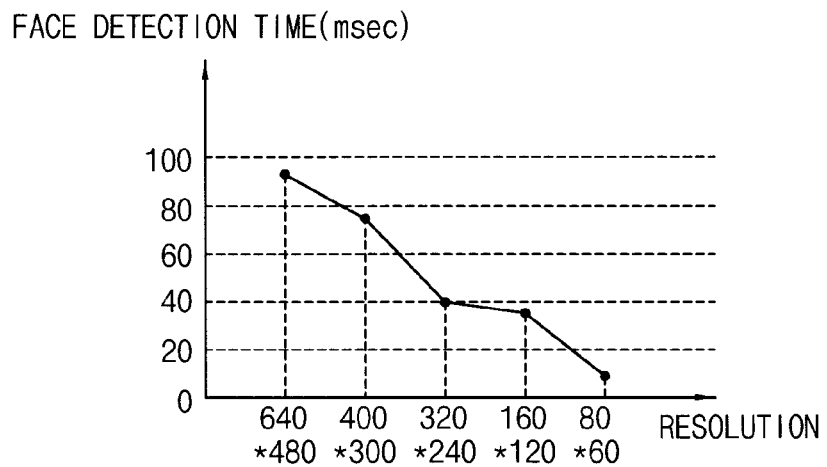

FIGS. 6 and 7 are graphs illustrating relationships between resolution of an image and face detection time.

FIG. 6 is a graph illustrating a relationship between resolution of an image and face detection time when the image includes one subject person.

FIG. 7 is a graph illustrating a relationship between resolution of an image and face detection time when the image includes a plurality of (five) subject persons.

Referring to FIG. 6, when a size (resolution) of the image is reduced by ½ both in the row direction and the column direction, a time required for detecting a face of the person is by ¼.

Referring to FIG. 7, when a size (resolution) of the image is reduced by ½ both in the row direction and the column direction and the image includes the plurality of (five) subject persons, a time required for detecting a face of the person is by ½.

The time required for detecting faces in the image is reduced when the resolution (size) of the image to be searched is reduced, because the time required for detecting faces in the image is inversely proportional to the resolution (size) of the image as illustrated in FIGS. 6 and 7.

Figure 8:
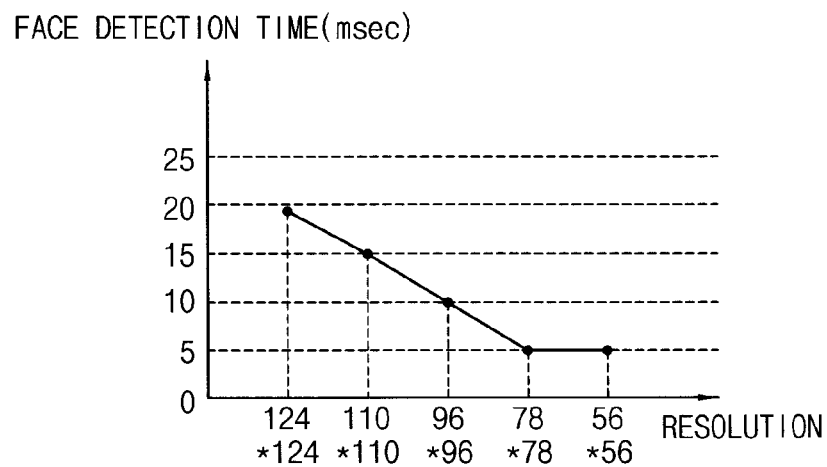
FIG. 8 is a graph illustrating a relationship between resolution (size) of a cropped image and face detection time.

FIG. 8 is a graph illustrating a relationship between resolution (size) of a cropped image and face detection time.

Referring to FIG. 8, since a resolution of the cropped second image IMG2 is much smaller than a resolution of the input image IMG or the down-scaled first image IMG1 as illustrated in FIG. 5E, the face detection operation may be rapidly performed.

Figure 9:
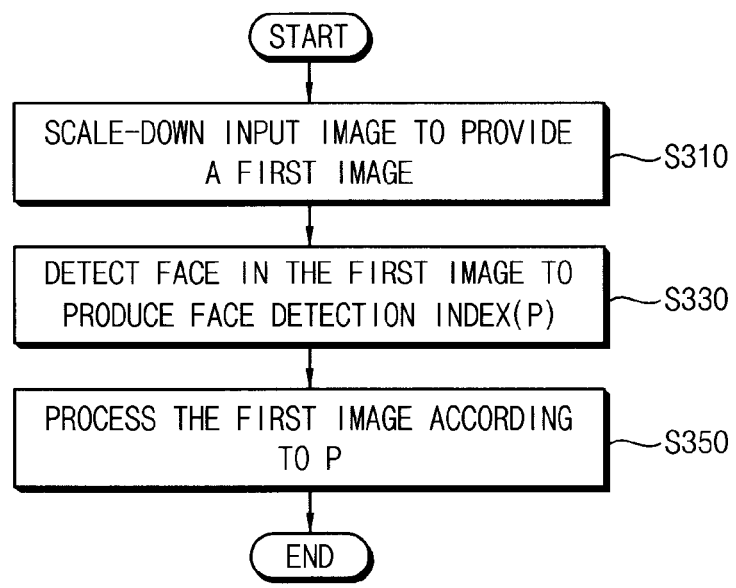
FIG. 9 is a flow chart illustrating a method of face detection according to some example embodiments.

FIG. 9 is a flow chart illustrating a method of detecting face according to some example embodiments.

Referring to FIGS. 2 through 5E and FIG. 9, a resolution of the input image IMG is scaled-down according to a down-scaling ratio DSR and the first image IMG1 (S310). A face is detected in the first image IMG1 using the face detection unit 120 and the control unit 150 and the face detection index P is calculated (S330). The face detection unit 120 may provide the coordinate information on the face region in the first image IMG1 to the control unit 150. The control unit 150 may calculate the face detection index P based on the coordinate information in the face region. The control unit 150 may process the first image IMG1 according to the calculated face detection index P (S350).

Figure 10:
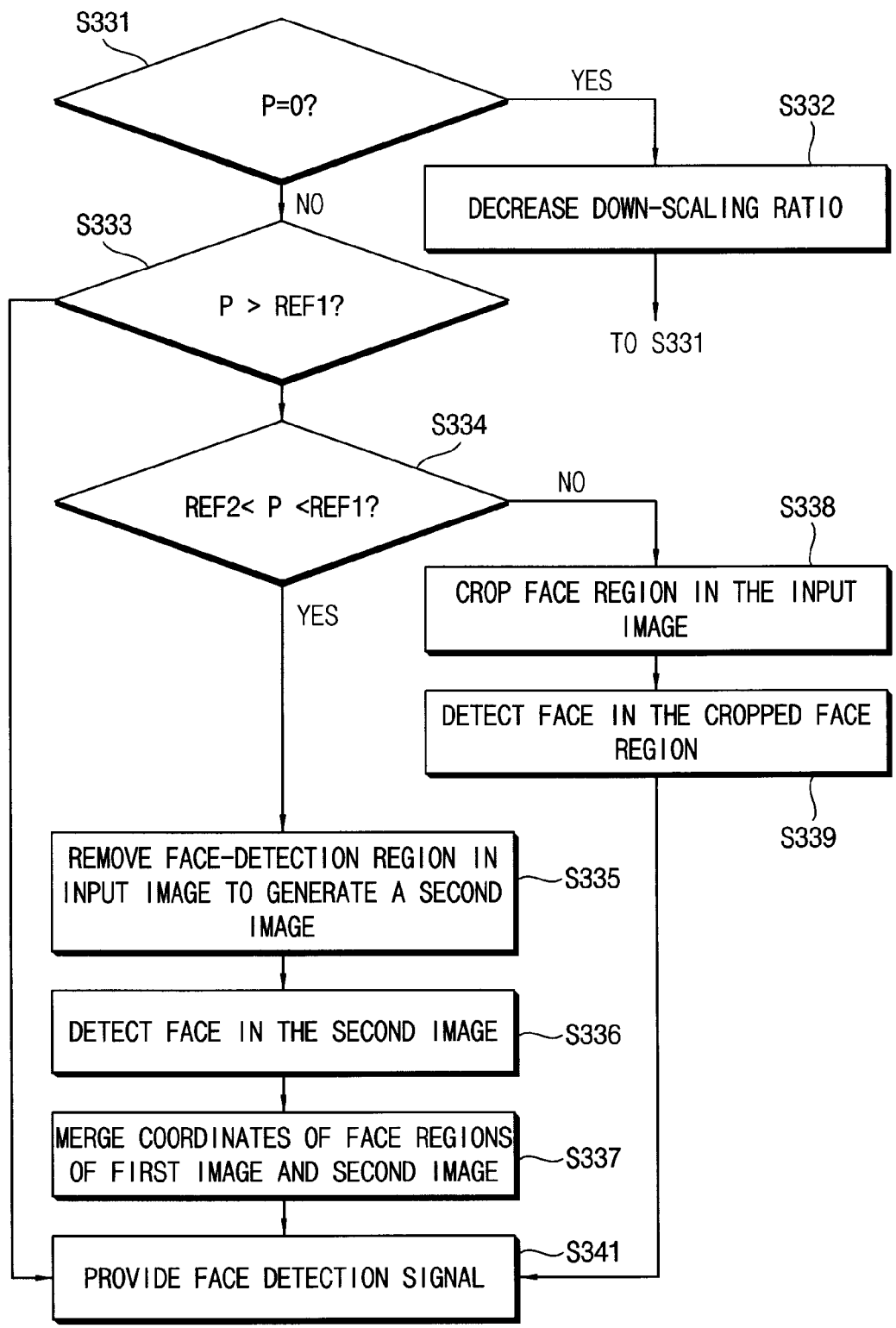
FIG. 10 is a flow chart illustrating the step (S330) in FIG. 9 according to some example embodiments.

FIG. 10 is a flow chart illustrating the step (S330) in FIG. 9 according to some example embodiments.

Referring to FIGS. 1 through 5E and FIG. 10, it is determined whether the face detection index P is zero or not (S331). When the face detection index P is zero (YES in S331), the down-scaling ratio is decreased (S332) because the resolution of the first image IMG is too scaled down. The face detection index P is calculated again and it is determined whether the face detection index P is zero or not (S331). When the face detection index P is not zero (NO in S331), it is determined whether the face detection index P is greater than the first reference value REF1 or not (S333). When the face detection index P is greater than the first reference value REF1 (YES in S333), the control unit 150 generates the face detection signal FDS with '111' to be provided to the CPU 97 (S341). When the face detection index P is not greater than the first reference value REF1 (NO in S333), it is determined whether the face detection index P is greater than the second reference value REF2 or not (S334). When the face detection index P is between the second reference value REF2 and the first reference value REF1 (YES in S334), the second control signal CON2 is enabled and the pattern remover 163 removes a region corresponding to the face region in the first image IMG1 in the input image IMG to provide the second image IMG2 to the face detection unit 120 (S335). The face detection unit 120 receives the second image IMG2 and performs face detection operation on the second image IMG2 (S336). The control unit 150 merges the coordinate information in the first image IMG1 and the coordinate information in the second image IMG2 on the face region (S337) to calculate the face detection index P according to the merged coordinate information. The control unit 150 generates the face detection signal FDS with '101' to be provided to the CPU 97 (S341). When the face detection index P is smaller than the second reference value REF2 (NO in S334), the third control signal CON3 is enabled and the cropper 165 crops a region corresponding to the face region in the first image IMG1 in the input image IMG to provide the third image IMG3 to the face detection unit 120, in response to the third control signal CON3 (S338). The face detection unit 120 receives the third image IMG3 and performs face detection operation on the second image IMG3 (S339). The face detection unit 120 updates the coordinate information on the face region. The control unit 150 updates the face detection index P according to the updated coordinate information on the face region to provide the face detection signal FDS with '100' to be provided to the CPU 97 (S341).

As described above, the FDPC and the image pickup device including the FDPC, according to some example embodiments, detect a face in the first image IMG1 whose resolution is adaptively reduced not in the original image and thus may reduce face detection time. In addition, the FDPC and the image pickup device include the pattern remover and the cropper for compensating for decreased face detection rate. Therefore, the image pickup device may perform the face detection operation rapidly on the input image using limited resources of the CPU efficiently.

Figure 11:
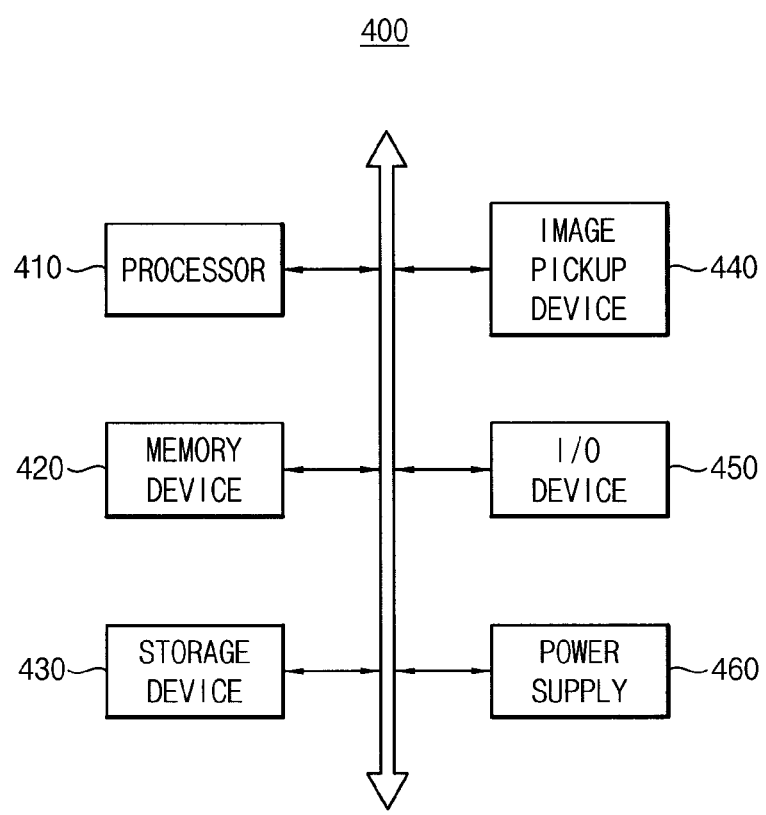
FIG. 11 is a block diagram illustrating a computing system including an image pickup device according to example embodiments.

FIG. 11 is a block diagram illustrating a computing system including an image pickup device according to example embodiments.

Referring to FIG. 11, a computing system 400 includes a processor 410, a memory device 420, a storage device 430, an image pickup device 440, an input/output device 450 and a power supply 460. Although it is not illustrated in FIG. 11, the computing system 400 may further include a port for communicating with electronic devices, such as a video card, a sound card, a memory card, a USB device, etc.

The processor 410 may perform specific calculations or tasks. For example, the processor 410 may be a microprocessor, a central process unit (CPU), a digital signal processor, or the like. The processor 410 may communicate with the memory device 420, the storage device 430 and the input/output device 440 via a bus 460 including an address bus, a control bus and/or a data bus. The processor 410 may be coupled to an extension bus, such as peripheral component interconnect (PCI) bus. The memory device 420 may store data for operating the computing system 400. For example, the memory device 420 may be implemented by a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. The storage device 430 may include a solid state drive, a hard disk drive, a CD-ROM, etc. The input/output device 450 may include an input device, such as a keyboard, a mouse, a keypad, etc., and an output device, such as a printer, a display device, etc. The power supply 460 may supply power to the computing device 400.

The image pickup device 440 may be coupled to the processor 410 via the buses or other communication links. As described above, the image pickup device 440 detects a face in the first image IMG1 whose resolution is adaptively reduced not in the original image and thus may reduce face detection time. In addition, the image pickup device 440 includes the pattern remover and the cropper for compensating for decreased face detection rate. Therefore, the image pickup device 440 may perform the face detection operation rapidly on the input image using limited resources of the CPU efficiently.

The computing system 4000 may be any computing system including the image pickup device 440. For example, the computing system 400 may include a digital camera, a mobile phone, a smart phone, a personal digital assistant (PDA), a portable multimedia player (PMP), etc.

As mentioned above, the FDPC and the image pickup device including the FDPC, according to some example embodiments, detect a face in the first image IMG1 whose resolution is adaptively reduced not in the original image and thus may reduce face detection time. In addition, the FDPC and the image pickup device include the pattern remover and the cropper for compensating for decreased face detection rate. Therefore, the image pickup device may perform the face detection operation rapidly on the input image using limited resources of the CPU efficiently.

Example embodiments of the inventive concepts may be applied to any system employing the FDPC and the image pickup device.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments of the inventive concepts. Accordingly, all such modifications are intended to be included within the scope of the inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A face detection processing circuit comprising:
    a down-scaler configured to scale down a resolution of an input image including at least one subject person according to a down-scaling ratio to provide a first image;
    a face detection unit configured to detect a face of the at least one subject person in the first image and configured to generate a coordinate information of a region of the detected face region;
    a control unit configured to calculate a face detection index indicating a ratio of the face region to the first image based on the coordinate information of the face region to provide control signals based on the face detection index and a face detection signal indicating whether a face is detected in the first image; and
    a down-scaling ratio controller configured to adjust the down-scaling ratio in response to the control signal;
    wherein the control unit is configured to calculate the face detection index based on a sum of the face region, a peak area of the face region and a number of the detected faces.

2. The face detection processing circuit of claim 1, wherein the face detection index is proportional to a first ratio of the sum of the face region to the first image, a second ratio of the peak area of the face region to the first image and a third ratio of the number of the detected face to the first image, the peak area corresponding to a face area in the face region.

3. The face detection processing circuit of claim 2, wherein the face detection index has a value smaller than one and equal to or greater than zero.

4. The face detection processing circuit of claim 1, wherein the control unit comprises:
    a calculation unit configured to calculate the face detection index based on the coordinate information of the face region;
    a comparison unit configured to output first and second comparison signals based on the face detection index and first and second reference values; and
    a signal generator configured to generate the control signal and the face detection signal based on the first and second comparison signals and the face detection index.

5. The face detection processing circuit of claim 4, wherein the comparison unit comprises:
    a first comparator configured to compare the face detection index and the first reference value to output the first comparison signal; and
    a second comparator configured to compare the face detection index and the second reference value to output the second comparison signal.

6. The face detection processing circuit of claim 1, wherein the control unit is configured to control the down-scaling ratio controller such that the down-scaling ratio controller decreases the down-scaling ratio when the face detection index corresponds to zero.

7. The face detection processing circuit of claim 1, wherein the control unit provides the face detection signal having a first logic level if the face detection index is equal to or greater than the first reference value.

8. The face detection processing circuit of claim 1, further comprising:
    a processing unit configured to process the input image and provide the processed image to the face detection unit according to control of the control unit if the face detection index has a value smaller than a first reference value and greater than zero.

9. The face detection processing circuit of claim 8, wherein the processing unit comprises:
    a buffer configured to store the input image;
    a pattern remover configured to remove the face region in the input image to provide a second image to the face detection unit if the face detection index has a value between a second reference value and the first reference value, the second reference value being smaller than the first reference value; and
    a cropper configured to crop the face region in the input image to provide a third image to the face detection unit if the face detection index has a value between zero and the second reference value.

10. The face detection processing circuit of claim 9, wherein the face detection unit is configured to detect another face region and generate another coordinate information of another face region to be provided to the control unit if the face detection index has a value between the second reference value and the first reference value.

11. The face detection processing circuit of claim 9, wherein the face detection unit updates the coordinate information of the face region based on the second image and provides the updated coordinate information to the control unit if the face detection index has a value between zero and the second reference value.

12. The face detection processing circuit of claim 9, further comprising:
    a register that stores the first and second reference values to be provided to the control unit.

13. The face detection processing circuit of claim 12, wherein the register further includes parameters that are required for the face detection unit to detect the face of the least one subject person.

14. An image pick-up device comprising:
    an image sensor configured to pick up an object image including at least one subject person;
    a face detection-processing circuit configured to detect a face of at least one subject person in the object image; and
    a display configured to display the object image with a region of the detected face region, the face detection-processing circuit including,
        a down-scaler configured to scale-down a resolution of the object image according to a down-scaling ratio to provide a first image;
        a face detection unit configured to generate coordinate information of the face region;
        a control unit configured to calculate a face detection index indicating a ratio of the face region to the first image based on the coordinate information of the face region to provide control signals based on the face detection index and a face detection signal indicating whether a face is detected in the first image; and
        a down-scaling ratio controller configured to adjust the down-scaling ratio in response to the control signal;
    wherein the control unit is configured to calculate the face detection index based on a sum of the face region, a peak area of the face region and a number of the detected faces.

15. A face detection circuit comprising:
    a down-scaler configured to scale down a resolution of an input image according to a down-scaling ratio to provide a first image;

a face detection unit configured to detect a face of at least one subject person in the first image;

a control unit configured to generate control signals based on the detected face;

a down-scaling ratio controller configured to adjust the down-scaling ratio in response to the control signal;

wherein the face detection unit is configured to generate coordinate information of a region of the detected face region;

wherein the control unit is configured to calculate a face detection index indicating a ratio of the face region to the first image based on the coordinate information of the face region, and the control signals include a face detection signal indicating whether a face is detected in the first image; and wherein the face detection index is proportional to a first ratio of the sum of the face region to the first image, a second ratio of the peak area of the face region to the first image and a third ratio of the number of the detected face to the first image, the peak area corresponding to a face area in the face region.

16. The face detection circuit of claim 15, wherein the control unit is configured to calculate the face detection index using the following equation, $$P(\text{face detection index}) = K(a*P\text{Area} + b*S\text{Area} + c*\text{FaceNum}),$$

where K is a reciprocal of an area of the first image, PArea is the sum of a face area in the face region, SArea denotes a sum of an area of the face region, FaceNum denotes a number of detected faces, and a, b and c are constants between zero and one.

* * * * *